(12) United States Patent
Hight (10) Patent No.: US 10,717,485 B2
(45) Date of Patent: Jul. 21, 2020

(54) BICYCLE SADDLE QUICK RELEASE (71) Applicant: Joshua C. Hight, Somerville, MA (US)

(72) Inventor: Joshua C. Hight, Somerville, MA (US)

(*) Notice: Subject to any disclaimer, the term of this patent is extended or adjusted under 35 U.S.C. 154(b) by 679 days.

(21) Appl. No.: 15/385,390

(22) Filed: Dec. 20, 2016

(65) Prior Publication Data

US 2017/0183049 A1    Jun. 29, 2017

Related U.S. Application Data (60) Provisional application No. 62/271,845, filed on Dec. 28, 2015.

(51) Int. Cl.
B62J 1/08 (2006.01)

(52) U.S. Cl.
CPC .................... *B62J 1/08* (2013.01)

(58) Field of Classification Search
CPC ........................................................ B62J 1/08
See application file for complete search history.

(56) References Cited

U.S. PATENT DOCUMENTS

| | | | | | |
|---|---|---|---|---|---|
| 5,048,891 | A | * | 9/1991 | Yach | B62J 1/04 297/215.14 |
| 5,702,093 | A | * | 12/1997 | Liao | B62J 1/04 267/132 |
| 5,749,622 | A | * | 5/1998 | Tseng | B62J 1/08 297/195.1 |
| 6,019,422 | A | * | 2/2000 | Taormino | B62J 1/04 297/195.1 |
| 6,626,490 | B2 | * | 9/2003 | Williams | B62J 1/08 297/195.1 |
| 6,942,290 | B1 | * | 9/2005 | Gootter | B62J 1/00 297/195.1 |
| 7,431,391 | B2 | * | 10/2008 | Hsiao | B62J 1/08 297/215.14 |
| 7,559,603 | B1 | * | 7/2009 | Chiang | B62J 1/08 297/215.14 |
| 7,775,588 | B2 | * | 8/2010 | Segato | B62J 1/08 297/215.13 |
| 8,544,947 | B2 | * | 10/2013 | Sloan | B62J 1/08 297/215.13 |
| 8,640,999 | B2 | * | 2/2014 | Chen | B62J 1/08 248/158 |

(Continued)

FOREIGN PATENT DOCUMENTS

| | | | | |
|---|---|---|---|---|
| DE | 10036379 C1 | * | 10/2001 | B62J 1/02 |
| DE | 102006004642 A1 | * | 8/2006 | B62J 1/08 |

(Continued)

*Primary Examiner* — Michael P Ferguson
(74) *Attorney, Agent, or Firm* — Morse, Barnes-Brown & Pendleton, P.C.; Sean D. Detweiler, Esq.; Stanley F. Chalvire, Esq.

(57) ABSTRACT

A quick-release mechanism enables the saddle of a cycling apparatus to be removed and installed to and from the cycling apparatus without the use of tools. The upper portion of the quick-release mechanism couples directly to the rails of the saddle. The lower portion of the quick-release saddle adapter is pivotally coupled to a saddle mounting post or secured to the cycling apparatus in place of the saddle by using the mechanism intended for mounting the cycling saddle. The quick-release mechanism may also be integrated into a standard cycling apparatus mount post.

7 Claims, 13 Drawing Sheets

(56) References Cited

U.S. PATENT DOCUMENTS

| | | | |
|---|---|---|---|
| 8,668,261 B2 * | 3/2014 | Schranz | B62K 19/36 |
| | | | 297/195.1 |
| 8,911,012 B2 * | 12/2014 | Choi | B62J 1/04 |
| | | | 297/215.15 |
| 2002/0053818 A1 * | 5/2002 | Williams | B62J 1/08 |
| | | | 297/195.1 |
| 2003/0227198 A1 * | 12/2003 | Menayan | B62J 1/08 |
| | | | 297/215.14 |
| 2005/0067863 A1 * | 3/2005 | Roizen | B62J 1/08 |
| | | | 297/215.14 |
| 2007/0164590 A1 * | 7/2007 | Hsiao | B62J 1/08 |
| | | | 297/215.15 |
| 2009/0127898 A1 * | 5/2009 | Segato | B62J 1/08 |
| | | | 297/215.14 |
| 2009/0174237 A1 * | 7/2009 | Chen | B62J 1/08 |
| | | | 297/215.13 |
| 2009/0179466 A1 * | 7/2009 | Tsai | B62J 1/08 |
| | | | 297/201 |
| 2010/0327641 A1 * | 12/2010 | Schranz | B62J 1/08 |
| | | | 297/215.13 |
| 2011/0254328 A1 * | 10/2011 | Sloan | B62J 1/08 |
| | | | 297/215.14 |
| 2014/0091603 A1 * | 4/2014 | Monaco | B62J 1/08 |
| | | | 297/195.1 |
| 2014/0308071 A1 * | 10/2014 | Darley | B62K 19/36 |
| | | | 403/322.4 |
| 2017/0217520 A1 * | 8/2017 | Shenkman | B62H 5/006 |
| 2019/0084636 A1 * | 3/2019 | Blyer | B62J 1/08 |

FOREIGN PATENT DOCUMENTS

| | | | | |
|---|---|---|---|---|
| DE | 102005043423 A1 * | 3/2007 | | B62J 1/04 |
| DE | 102009039503 A1 * | 3/2011 | | B62J 1/04 |
| DE | 202016100529 U1 * | 3/2016 | | B62J 1/08 |
| DE | 202016103803 U1 * | 7/2016 | | B62J 1/08 |
| DE | 202018003888 U1 * | 9/2018 | | B62J 1/02 |
| EP | 1394027 A2 * | 3/2004 | | B62J 1/08 |
| EP | 1731414 A2 * | 12/2006 | | B62J 1/08 |
| FR | 641119 A * | 7/1928 | | B62J 1/02 |
| FR | 2710308 A1 * | 3/1995 | | B62J 1/04 |
| FR | 2710308 B1 * | 2/1996 | | B62J 1/04 |

* cited by examiner

SECTION C-C
SCALE 1.5 : 1

DETAIL D
SCALE 3 : 1

SECTION E-E  FIG. 8B

FIG. 8C   SECTION A-A

SECTION B-B

BICYCLE SADDLE QUICK RELEASE

CROSS-REFERENCE TO RELATED APPLICATION(S)

This application claims priority to, and the benefit of, U.S. Provisional Application 62/271,845, filed Dec. 28, 2015, for all subject matter common to both applications. The disclosure of said provisional application is hereby incorporated by reference in its entirety.

FIELD OF THE INVENTION

The present invention relates to a quick-release saddle adapter for a cycling apparatus suitable for enabling the quick release removal of a saddle from a bicycle frame and attachment to the bicycle frame without requiring the use of tools.

BACKGROUND

Bicycle saddles are often stolen and left out in inclement weather because they cannot be removed from the bicycle without the use of tools or by removing the saddle post along with the saddle.

Exercise bicycle saddles can be viewed as uncomfortable and are not always thoroughly cleaned between users. This can result in physical pain to the rider and a potential spread of staph, fungi, and yeast on publicly shared bicycle saddles.

SUMMARY

The present invention seeks to provide a solution to this problem(s) by providing a saddle adapter that enables a cyclist to quickly remove and attach a cycling saddle to and from a mobile or stationary cycling apparatus without the use of tools using a device that is not cumbersome to transport, and does not require lubrication that could transfer onto the cyclist and their belongings. Furthermore, the present invention does not require a secondary assembly to be coupled to the saddle in order to interface with a primary assembly mounted to the cycling apparatus. This present invention is unique at least because it allows only the saddle to be removed from the quick-release cycling apparatus and couples directly to the saddle, minimizing the size and weight of the body removed.

The lower end of the saddle adapter contains a profile that matches that of the saddle so that it may be secured to the cycling apparatus in place of the saddle or be mounted directly to a support post. By utilizing the saddle mounting connection of the cycling apparatus, no new parts or alterations to the cycling apparatus are required to have the benefit of a quick-release saddle. The upper end of the saddle adapter contains a profile that accepts dual rails of a conventional bicycle saddle and a quick-release coupling mechanism that secures and releases the saddle to and from the saddle adapter.

The quick-release saddle adapter when installed on a piece of public exercise equipment allows for the rider to bring their own seat to use in place of the public saddle on the cycling apparatus.

In accordance with example embodiments of the present invention, a saddle coupling adapter for a cycling apparatus is provided. The saddle includes a lower portion that is coupled to a saddle mounting mechanism(s) of the cycling apparatus and an upper portion having a quick-release mechanism that couples at least one rail of the saddle to the lower portion.

In accordance with aspects of the present invention, the lower portion comprises a pair of rails. An upper portion comprises a cam configured to couple the saddle to the saddle adapter. The upper portion can capture at least two sides of the at least one rail of the saddle.

In accordance with aspects of the present invention, the saddle is installed and removed to and from the cycling apparatus without affecting an angle at which the saddle is positioned. The quick-release mechanism locks or hinders the saddle from being removed.

In accordance with example embodiments of the present invention, a saddle coupling adapter for a cycling apparatus is provided. The saddle coupling adapter includes a quick-release mechanism pivotally coupled to a vertically adjustable support structure that is mountable to a cycling apparatus frame. The quick-release mechanism interfaces with at least one rail of a cycling saddle.

In accordance with aspects of the present invention, the quick-release mechanism comprises a cam. The vertically adjustable support structure comprises a post. The upper portion captures at least two sides of the at least one rail of the cycling saddle.

In accordance with aspects of the present invention, the cycling saddle is installed and removed to and from the cycling apparatus without affecting an angle at which the cycling saddle is positioned. The quick-release mechanism locks or hinders the cycling saddle from being removed.

In accordance with example embodiments of the present invention, a quick-release saddle adapter apparatus for a cycling apparatus is provided. The quick-release saddle adapter includes adapter rails fixedly attachable to a mount post of the cycling apparatus, a mount block fixedly attached to the adapter rails, and pivot locks pivotally coupled to the mount block. The rail grooves are configured to receive saddle rails of a cycling saddle. The rail capture surfaces are fixedly attached to the pivot locks, the rail capture surfaces having a locked position and an unlocked position, wherein the rail capture surfaces are configured to hold the saddle rails of the cycling saddle in place when in the locked position and release the saddle rails of the cycling saddle when in the unlocked position. The quick-release saddle adapter also includes at least one control lever rotatably coupled to the mount block and positionable in a locked lever position and an unlocked lever position, the locked lever position causing the rail capture surfaces to assume the locked position and the unlocked lever position causing the rail capture surfaces to assume the unlocked position.

In accordance with aspects of the present invention, the adapter rails are located between an upper clamp and a lower clamp, the upper clamp and the lower clamp fixedly attach the adapter rails to the mount post by tightening a screw and the adapter rails are fixedly attached to the mount block by means of pressed in pins traveling through the adapter rails and the mount block.

In accordance with aspects of the present invention, the quick-release saddle adapter also includes pins pivotally coupling the pivot locks to the mount block and latches pivotally coupled to cams. The pivot locks are held in unlocked position by torsion springs winding around the cams and compressed between the pins and a surface of the latches. When in the locked position, a spring force from the torsion springs forces the latches against the pivot locks, coupling, the saddle rails to the quick-release saddle adapter. When pressing the cycling saddle into the quick-release adapter, the saddle rails contact an open face of the pivot locks in the open position and causes the pivot locks to rotate about the pins and the latches to rotate about the cams to compress and increase a force of the torsion springs to the locked position.

In accordance with aspects of the present invention, the quick-release saddle adapter further includes an opening in the mount block configured to receive a padlock loop, an insertion of the padlock loop in the opening prevents the cycling saddle from being removed from the quick-release saddle adapter.

In accordance with aspects of the present invention, the at least one control lever is removably coupled to the mount block. In accordance with aspects of the present invention, the control levers in the locked level position cause latch detents to hold the pivot locks in the locked position and the control levers in the unlocked level position enable the latch detents to be rotated away from the pivot locks and release the pivot locks. Applying a vertical force to the cycling saddle in direction away from the mount post causes the pivot locks to rotate to the unlocked position and the cycling saddle is removed from the quick-release saddle adapter.

BRIEF DESCRIPTION OF THE DRAWINGS

The detailed description particularly refers to the accompanying figures in which.

DETAILED DESCRIPTION

For the purposes of promoting an understanding of the principles of the disclosure, reference will now be made to a number of illustrative embodiments illustrated in the drawings and specific language will be used to describe the same.

Cyclist for many reasons must store their bicycle or other cycling apparatus outside or they are required to use the saddle provided on publicly shared cycling equipment. The saddle of the cycling apparatus stored outside is exposed to inclement weather and because of the cost of cycling saddles they are often targeted by thieves. Removing a saddle from the cycling apparatus can be difficult and require multiple tools. The present disclosure includes, among other things, cycling saddle quick-release mechanism that adapts to the rails of a typical cycling saddle.

FIGS. 3A through 13, wherein like parts are designated by like reference numerals throughout, illustrate an example embodiment or embodiments of a saddle coupling adapter and system, according to the present invention. Although the present invention will be described with reference to the example embodiment or embodiments illustrated in the figures, it should be understood that many alternative forms can embody the present invention. One of skill in the art will additionally appreciate different ways to alter the parameters of the embodiment(s) disclosed, such as the size, shape, or type of elements or materials, in a manner still in keeping with the spirit and scope of the present invention.

Figure 1A:
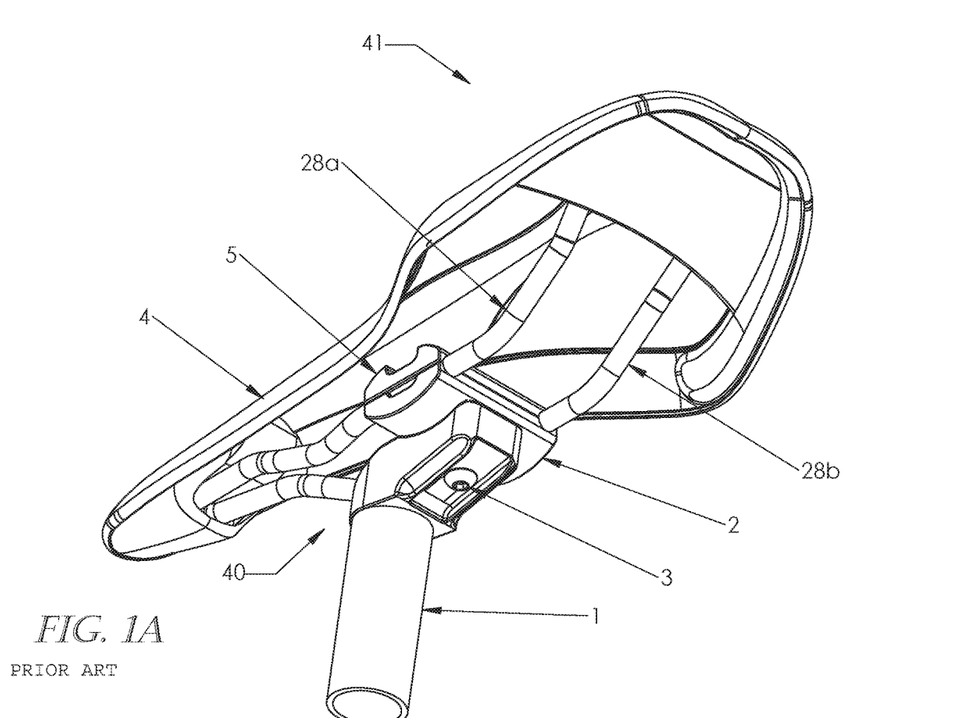
FIG. 1A is a perspective view of a conventional cycling saddle assembled to a mounting post utilizing a top clamp, a bottom clamp, and a screw.
Figure 1B:
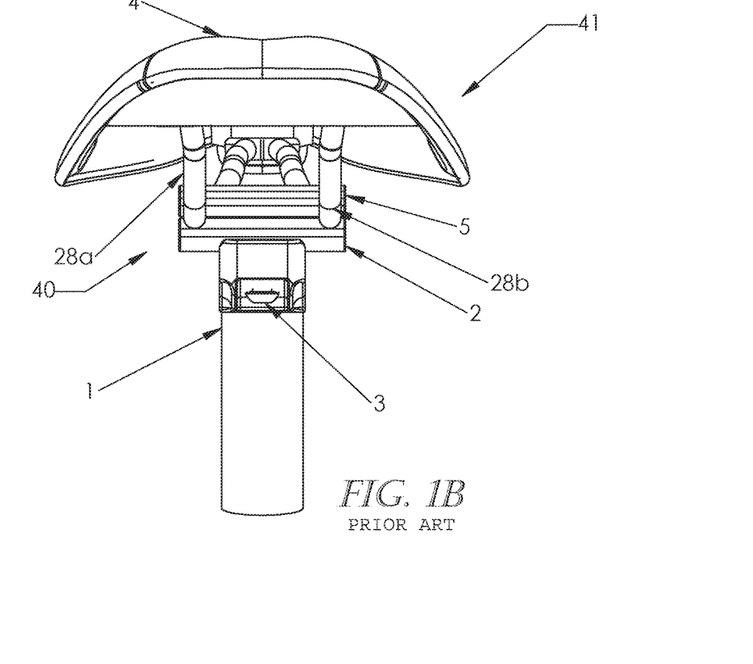
FIG. 1B is the rear perspective of a conventional cycling saddle assembly shown in FIG. 1A.
Figures 2A, 2B:
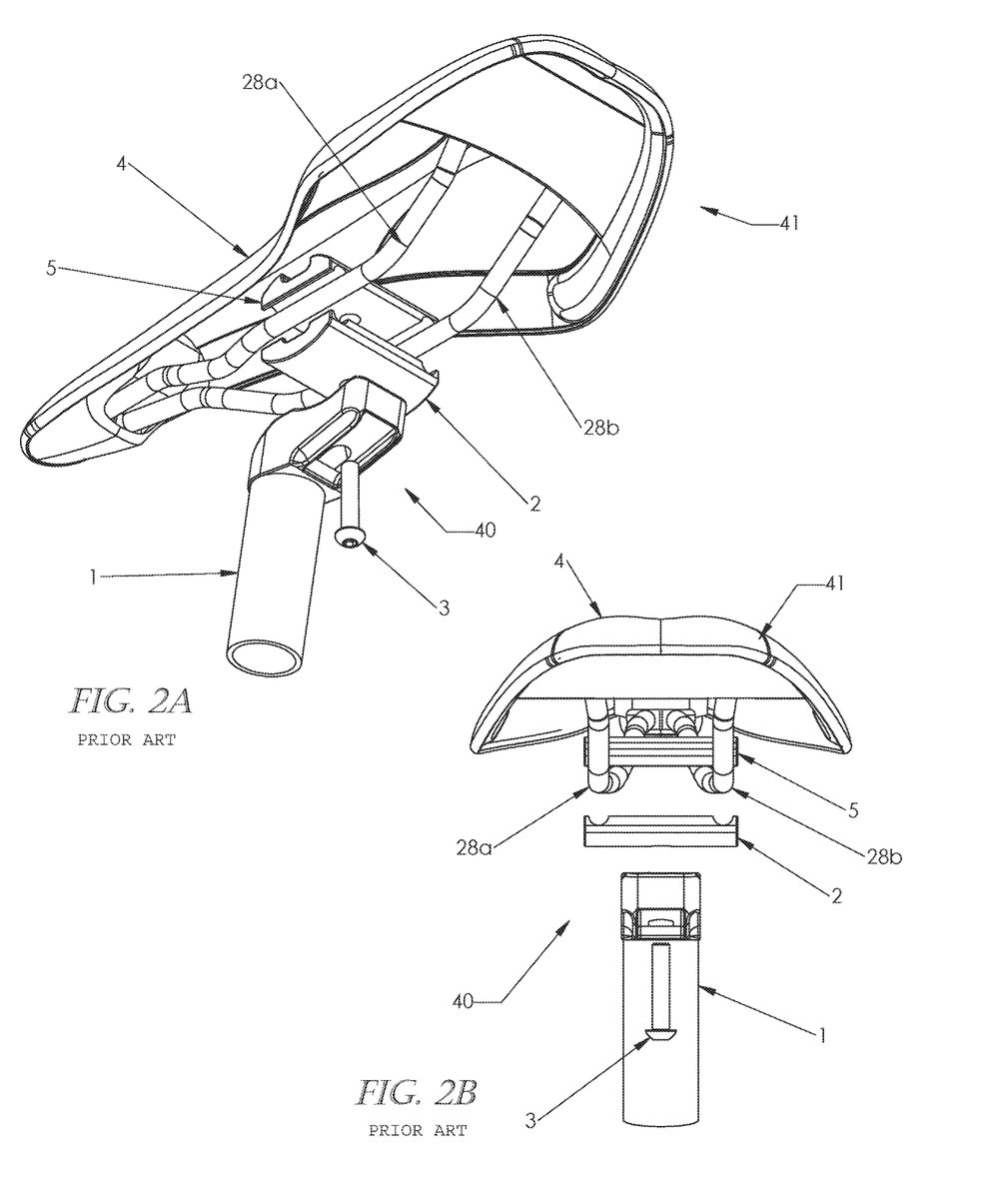
FIG. 2A is a disassembled perspective view of the conventional cycling saddle assembly shown in FIG. 1A.
FIG. 2B is the rear perspective view of the disassembled cycling saddle assembly shown in FIG. 2A.
Figure 3A:
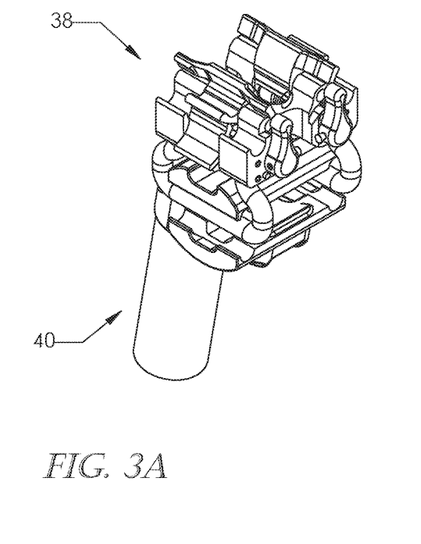
FIG. 3A is a disassembled perspective view of the saddle quick-release mechanism along with the saddle mounting post, upper clamp, lower clamp, and screw shown in FIG. 1A.
Figure 3B:
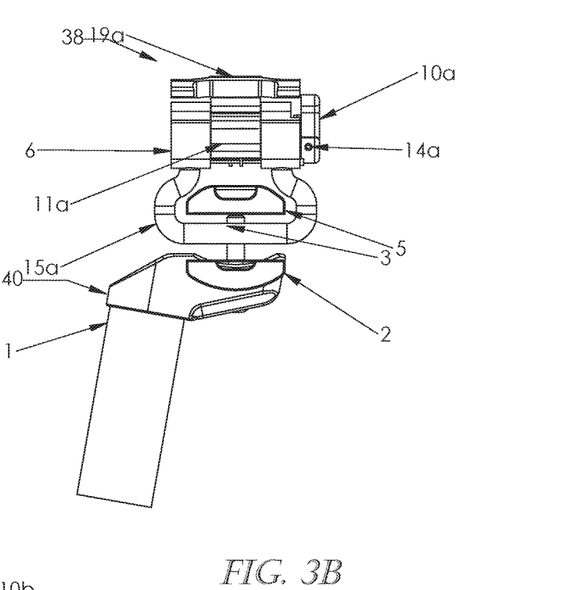
FIG. 3B is a side perspective view of the system shown in FIG. 3A.
Figure 3C:
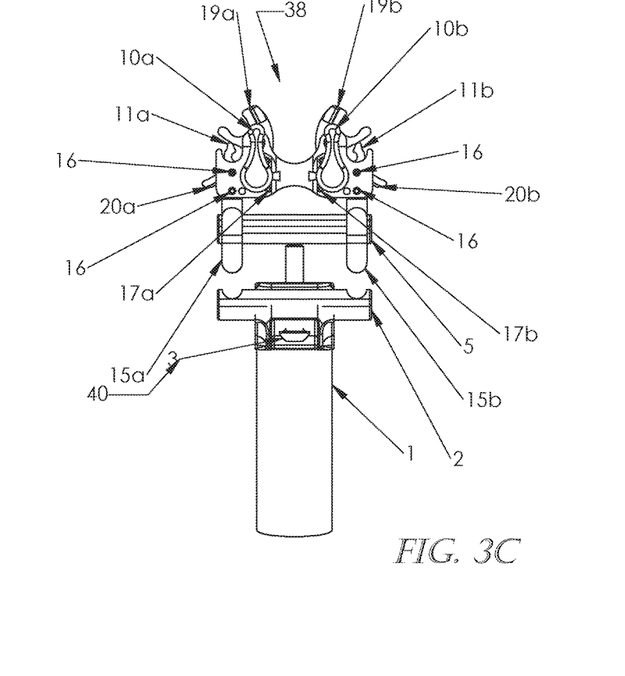
FIG. 3C is the rear perspective view of the system shown in FIG. 3A.

An illustrative embodiment of a conventional cycling saddle 41 consists of a seat platform 4 and a pair of saddle rails 28a and 28b as shown in FIGS. 1A and 1B. Cycling saddle 41 is secured to a typical saddle mounting apparatus 40 which includes, but is not limited to, a, upper clamp 5, lower clamp 2, mount post 1, and screw 3 as shown in FIG. 1A and FIG. 1B. In illustrative embodiments 1A, 1B, 2A, 2B, 3A, 3B, 3C, 4A, 4B, 4C, 5A, 5B, 6A, 6B, 10A, 10B, 10C, 11A, 11B, 12A, 12B, and 13, the cylindrical tube end of mount post 1 and custom mount post 23 couples to the frame of a cycling apparatus.

The seat platform 4 supports the buttock of the cyclist. Saddle rails 28a and 28b are affixed to underside of seat platform 4. Cycling saddle 41 is secured to the typical saddle mounting apparatus 40. Upper clamp 5 interfaces with the top surface of saddle rails 28a and 28b. The top surface of lower clamp 2 interfaces with the bottom surface of saddle rails 28a and 28b. The bottom surface of lower clamp 2 interfaces with mount post 1. Screw 3 travels through a slot in mount post 1, through a hole in lower clamp 2 and threads into a tapped hole in upper clamp 5. Screw 3 is tightened and the upper clamp 5, lower clamp 2, and saddle rails 28a and 28b are rigidly fixed to mount post 1 as suggested in FIGS. 1A, 1B, 2A, and 2B.

Figure 4A:
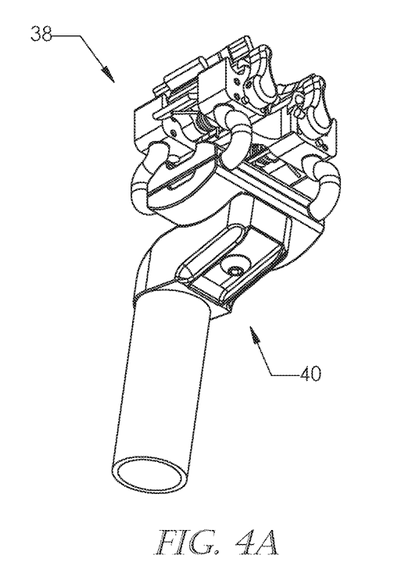
FIG. 4A is a perspective view of the saddle quick-release mechanism secured to a standard saddle mounting post in place of the cycling saddle shown in FIG. 1A.
Figure 4B:
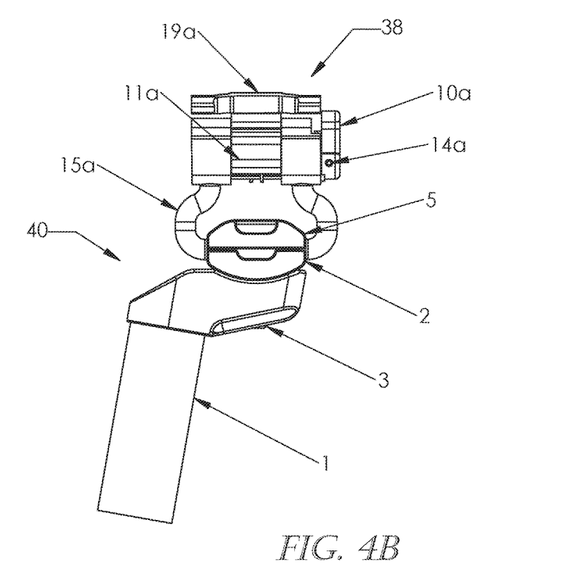
FIG. 4B is a side perspective view of the system shown in FIG. 4A.
Figure 4C:
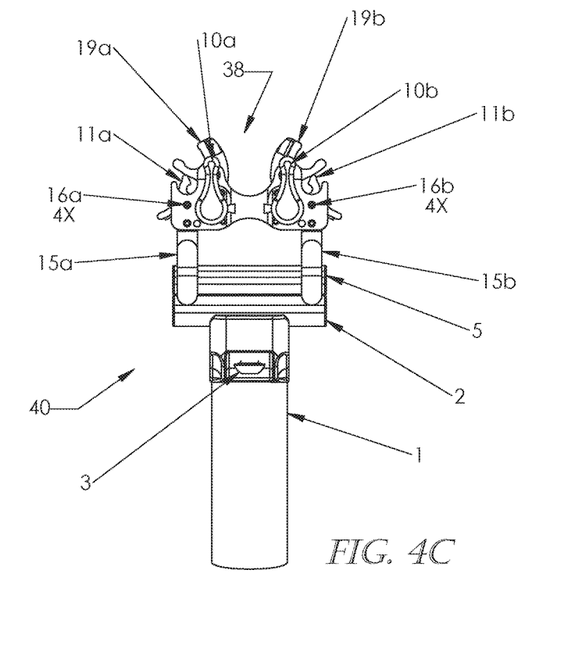
FIG. 4C is the rear perspective view of the system shown in FIG. 4A.

Quick-release saddle adapter 38 is coupled to typical saddle mounting apparatus 40. Adapter rails 15a and 15b secures to mount post 1 in place of saddle rails 28a and 28b as shown in FIGS. 4A, 4B, and 4C. Same as securing cycling saddle 41, screw 3 is tightened and the upper clamp 5, lower clamp 2, and adapter rails 15a and 15b are rigidly fixed mount post 1. The user can adjust the angle of the quick-release saddle adapter 38 relative to mount post 1 by pivoting the bottom surface of lower clamp 2 that pivots about mount post 1 prior to tightening screw 3.

Figures 7A, 7B:
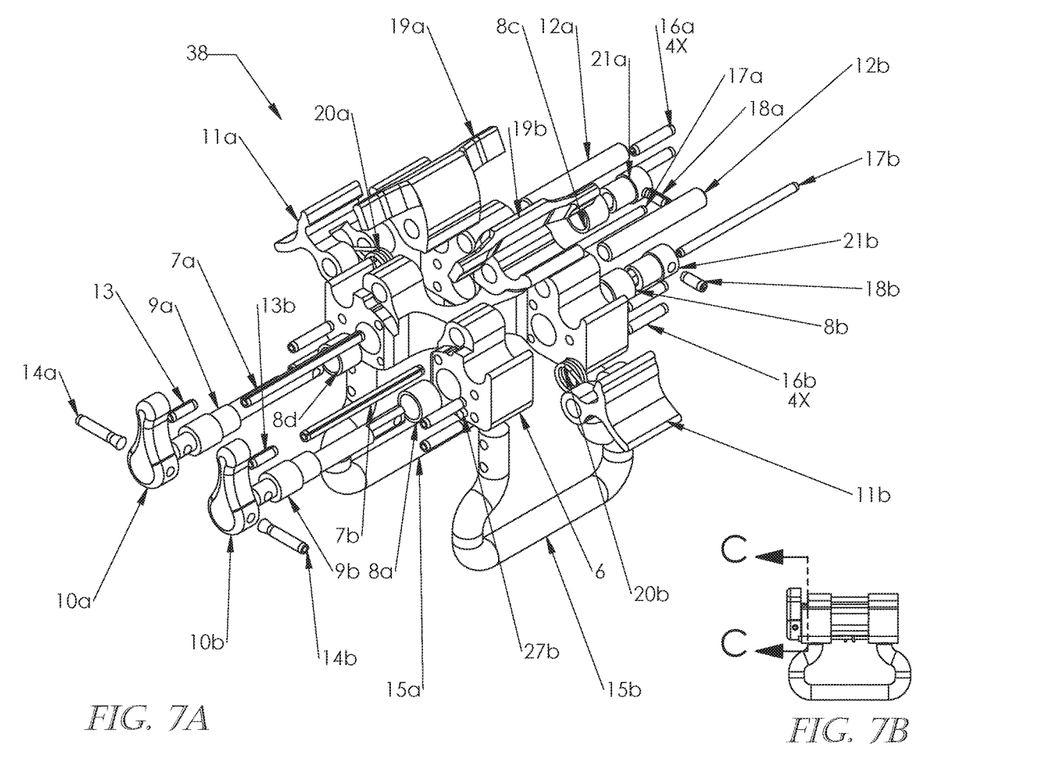
FIG. 7A is an exploded view of the components that make up the saddle quick-release mechanism in an unlocked state.
FIG. 7B is a side perspective view of the saddle quick-release mechanism depicting a cross-sectional view.
Figure 7C:
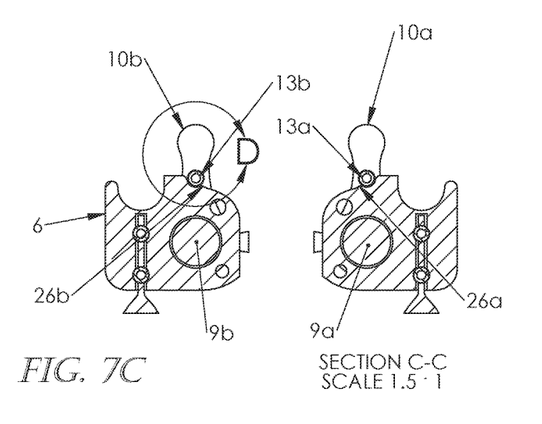
FIG. 7C is a cross-sectional view C-C of the saddle quick-release mechanism defined by the details of FIG. 7B.

Adapter rails 15a and 15b are connected to mount block 6. Adapter rails 15a and 15b are placed into round holes on the bottom side of mount block 6 until the small cross holes 16 in mount block 6 and adapter rails 15a and 15b align. The adapter rails 15a and 15b are secured to mount block 6 by pressed in pins 16a and 16b that travel through both mount block 6 and adapter rails 15a and 15b as shown in FIGS. 4C, 7A, and 7C.

Figures 5A, 5B:
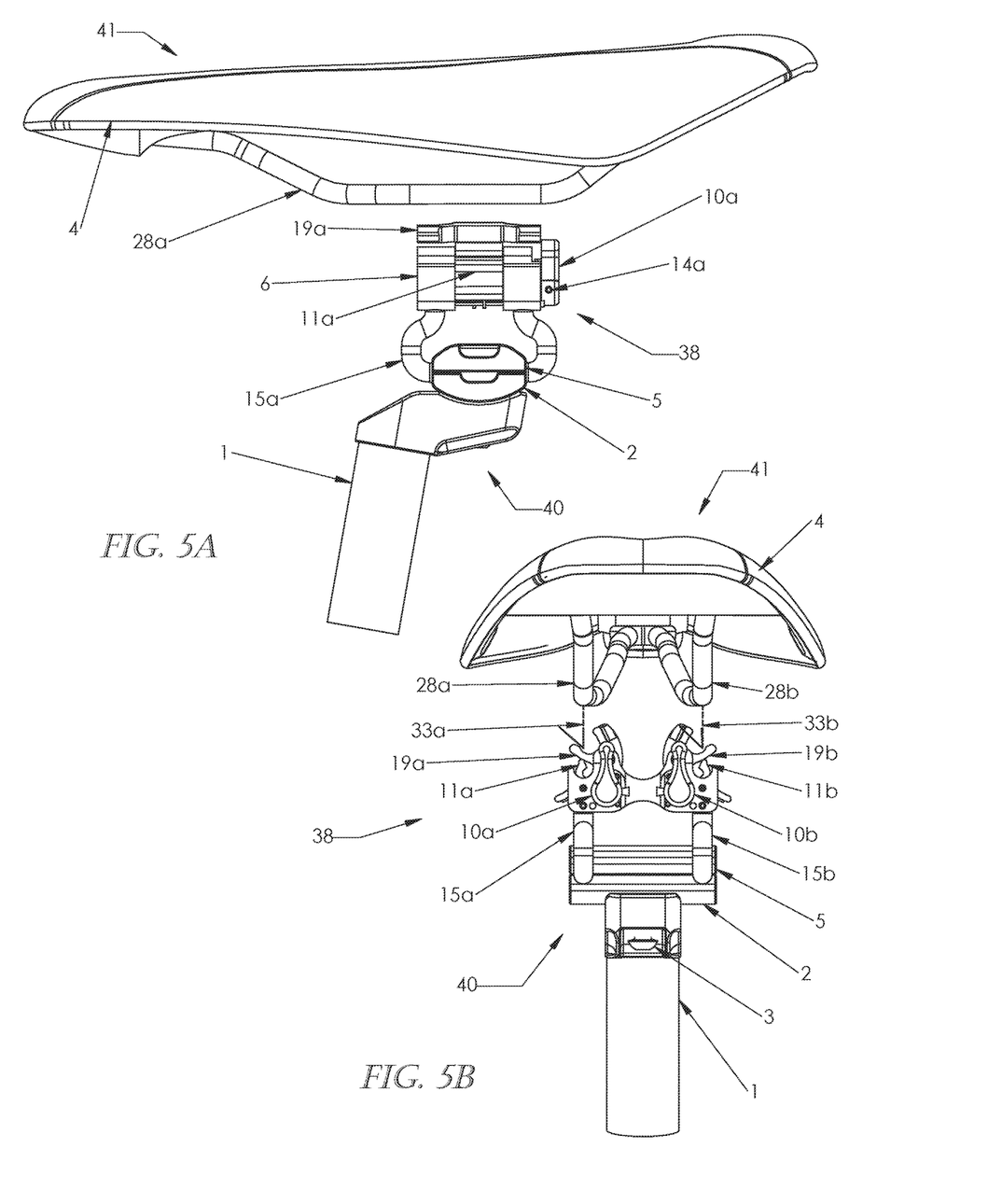
FIG. 5A is a side perspective view of a cycling saddle aligned above the saddle quick-release mechanism coupled to a saddle mounting post shown in FIG. 4A.
FIG. 5B is the rear perspective view of the system shown in FIG. 5A, indicating the direction in which the saddle must travel to connect to the quick-release mechanism.

Quick-release saddle adapter 38 is shown in the open position in FIGS. 5A and 5B. Pivot lock 19a is pivotally coupled to mount block 6 by pin 12a. Latch 11a is pivotally coupled to cams 9a. Pivot lock 19a is held in the open position by torsion spring 20a winding around cam 9a and compressed between pin 17a and the surface of latch 11a; the force from torsion spring 20a causes latch 11a to rotate and press against the underside of pivot lock 19a; as a result pivot lock 19a rotates until it contacts pin 7a as shown in FIG. 8C, which is the same for mirrored components pivot lock 19b, pin 7b, cam 9b, pin 17b, latch 11b and spring 20b.

Cycling saddle 41 slidably couples to the quick-release saddle adapter 38 by pressing the cycling saddle 41 down, following trajectories 33a and 33b, until the saddle rails 28a and 28b are seated in rail grooves 37a and 37b of mount block 6 as shown in FIGS. 5A, 5B, 6A, 6B, 8A, and 8C. The user can move the cycling saddle 41 into the desired position relative to mount post 1 by translating the cycling saddle 41 along the length of saddle rails 28a and 28b that are both parallel and horizontal relative to each other.

When pressing the cycling saddle 41 into the quick-release saddle adapter 38, saddle rail 28a contacts the open face of pivot lock 19a and saddle rail 28b contacts the open face of pivot lock 19b as shown in FIG. 5B. The force from saddle rails 28a and 28b causes pivot locks 19a and 19b to rotate about axes defined by pins 12a and 12b which in turn causes latches 11a and 11a to rotate about cams 9a and 9b, compressing and increasing the force of torsion spring 20a and 20b on the underside of latches 11a and 11b. In FIG. 8C torsion spring 20a is in the uncompressed state and torsion spring 20b is in the compressed state. In the illustrative embodiment prior to the end of rotation of pivot locks 19a and 19b, pivot lock ends 35a and 35b rotate beyond the contacting surface of latches 11a and 11b. The aforementioned spring force from torsion springs 20a and 20b forces latches 11a and 11b against pivot locks 19a and 19b, mating pivot lock ends 35a and 35b into latch detents 36a and 36b. The pivot lock ends 35a and 35b captured within latch detents 36a and 36b slidably couples saddle rails 28a and 28b to the quick-release saddle adapter 38.

Figure 7D:
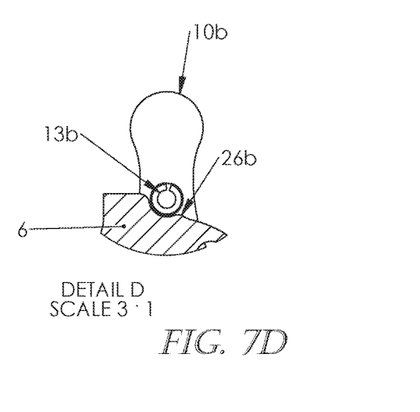
FIG. 7D is a detailed view, defined by FIG. 7C, of how the pin secured to the knob interfaces with the base in an unlocked position to prevent unwanted rotation of the knob.
Figure 8A:
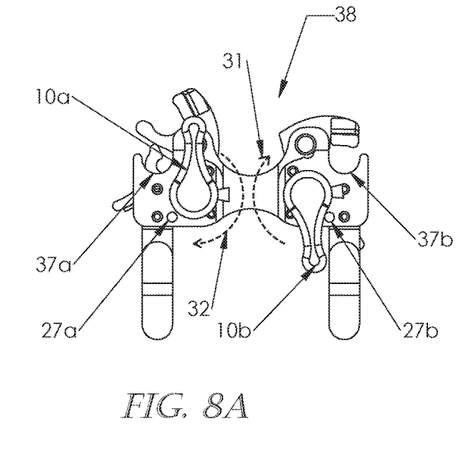
FIG. 8A is a rear perspective view of the saddle quick-release mechanism showing one knob in the locked and another knob the unlocked position, and the direction of which the knobs can rotate in their current state.
Figure 8B:
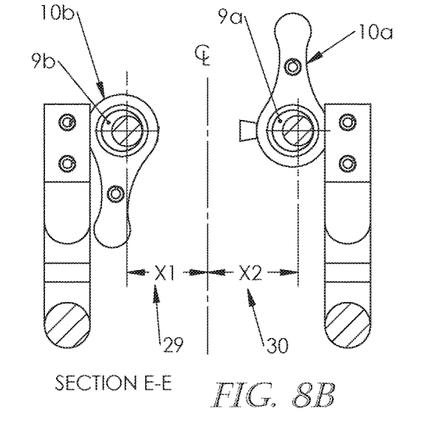
FIG. 8B is a cross-sectional view E-E of the saddle quick-release mechanism defined by FIG. 8D that shows the position of the cam when the knob is in a locked and unlock state.
Figure 8C:
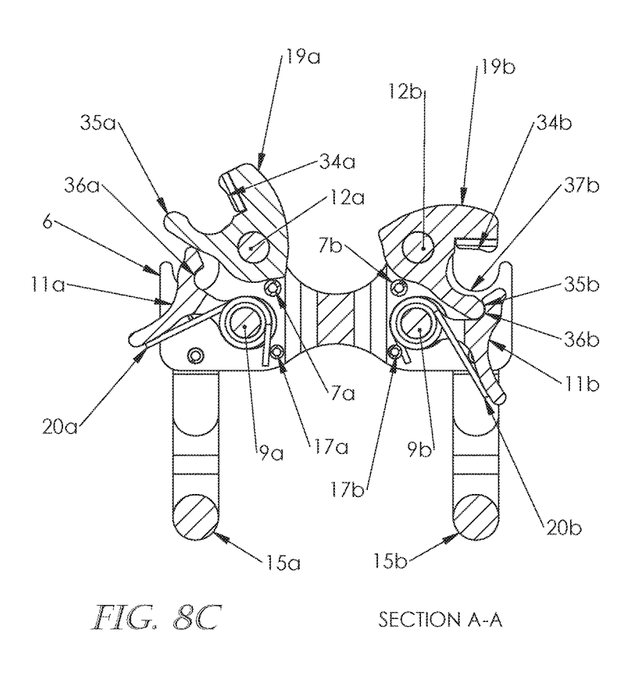
FIG. 8C is a cross-sectional view A-A of the saddle quick-release mechanism defined by FIG. 8E that shows the interface between the latch, cam, and the upper portion that receives the cycling saddle rails.
Figure 8D:
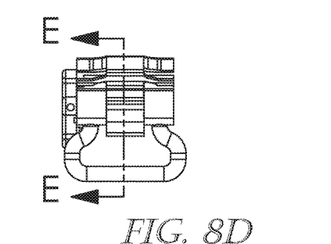
FIG. 8D is a perspective view of the saddle quick-release mechanism that defines cross-section E-E.
Figure 8E:
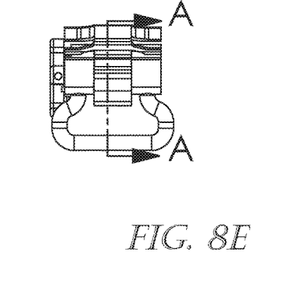
FIG. 8E is a perspective view of the saddle quick-release mechanism that defines the cross-section A-A.
Figure 9A:
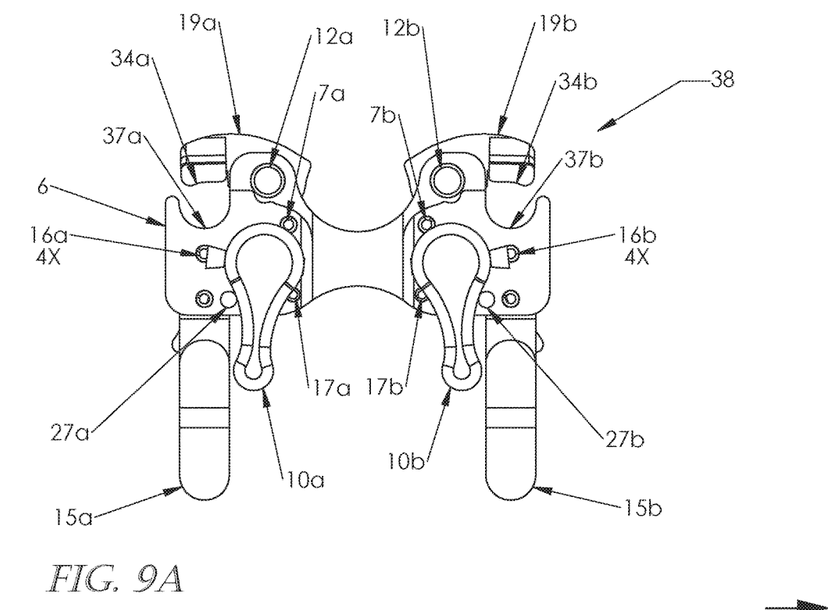
FIG. 9A is a perspective view of the saddle quick-release mechanism with both knobs and all moving components oriented in a locked state.
Figures 9B, 9C:
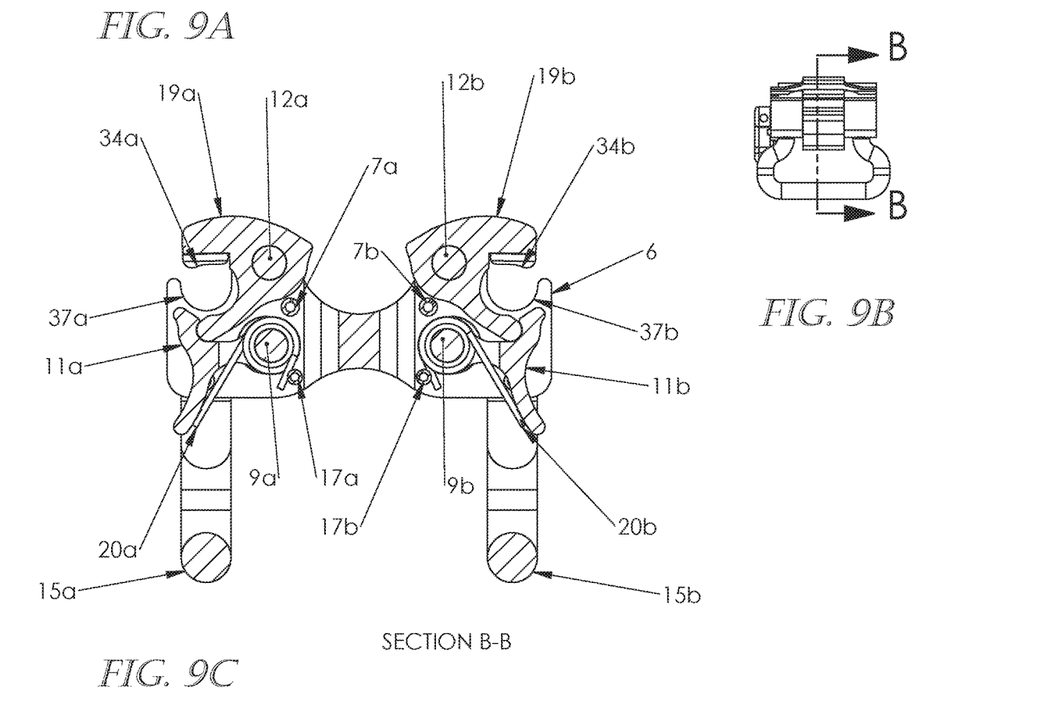
FIG. 9B is a perspective view of the saddle quick-release mechanism that defines cross-section B-B.
FIG. 9C is a cross-sectional view B-B of the saddle quick-release mechanism defined by FIG. 9B that shows the internal components of the mechanism in the locked state.

Control levers 10a and 10b rotate between two resting positions as shown in FIGS. 8A and 8B. Control lever 10a, as depicted in FIGS. 8A and 8B, is in the unlocked position which allows for saddle rail 28a to be linearly adjusted, installed, or removed from the quick-release saddle adapter 38. Control lever 10a rotates in the direction indicated by rotational direction 32 to achieve the locked position. Lever lock stops 27a and 27b stop the rotation of control levers 10a and 10b in the locked direction. Control lever 10b, as depicted in FIGS. 8A and 8B, is in the locked position which secures saddle rail 28b to the quick-release saddle adapter 38. Rotational direction 31 indicates the direction control lever 10b rotates to achieve the unlocked position. The unlock rotation of control levers 10a and 10b is stopped as pins 13a and 13b interfere with mount block 6, as shown in FIGS. 7C and 7D. Pins 13a and 13b are pressed into holes in control levers 10a and 10b. Control levers 10a and 10b are retained in the unlocked position by pins 13a and 13b rotating over unlock detents 26a and 26b.

Figures 6A, 6B, 6C:
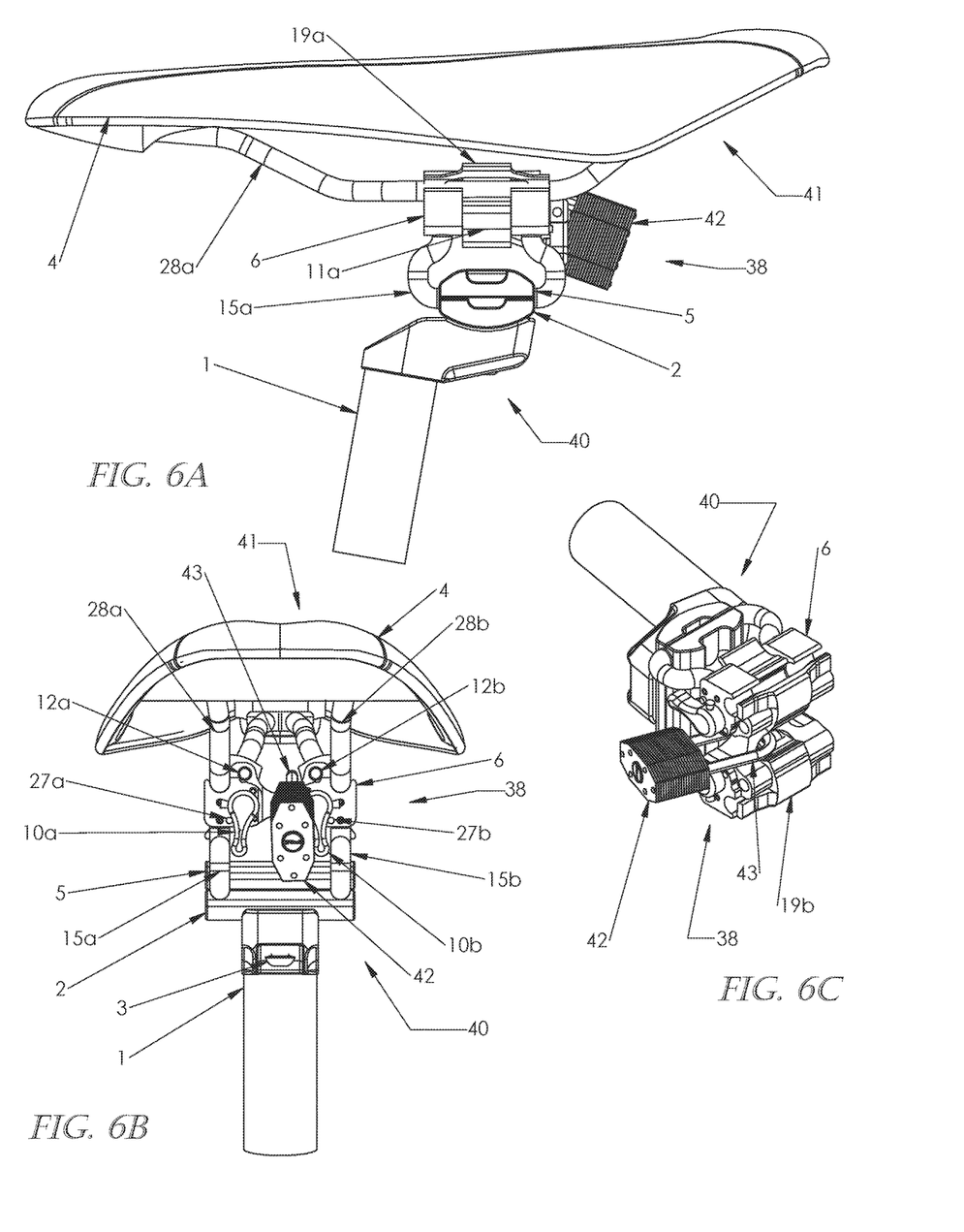
FIG. 6A is a side perspective view of the cycling saddle coupled to the quick-release mechanism and locked in place.
FIG. 6B is the rear perspective view of the system shown in FIG. 6A.
FIG. 6C is an isometric view of the system shown in FIG. 6A with the saddle removed.

The ability to remove the cycling saddle 41 from the quick-release saddle adapter 38 is disabled by padlock 42 as shown in FIGS. 6A, 6B, and 6C. Padlock loop 43 is secured around an opening of mount block 6 between latch 11b and pivot lock 19b. Padlock 42 along with padlock loop 43, when secured to mount block 6, interfere with unlock rotational direction 31 of control lever 10b. Rail capture surface 34b must rotate away from rail groove 37b about the axis defined by pin 12b until pivot lock 19b contacts pin 7b to create sufficient clearance for saddle rail 28b to be removed from quick-release saddle adapter 38. Padlock loop 43 when secured to mount block 6 further prevents cycling saddle 41 removal by obstructing rotation of pivot lock 19b.

The ability to remove the cycling saddle 41 from the quick-release saddle adapter 38 may also be disabled by removal of control levers 10a and 10b. Control levers 10a and 10b create the necessary rotation to release cams 9a and 9b. Spring pins 14a and 14b removable couple control levers 10a and 10b to cams 9a and 9b when lightly pressed by hand into the aligned holes. Manually removing spring pins 14a and 14b by pulling on the exposed end enables the control levers 10a and 10b to be removed. Alignment holes are the same for cams 9a and 9b as well as for control levers 10a and 10b allowing either control lever to be mounted to either cam. A single control lever 10a or 10b can be used to operate both cams 9a and 9b if desired.

Cam ends 21a and 21b are affixed to cams 9a and 9b by pins 18a and 18b, as shown in FIG. 7A. Bushings 8a, 8b, 8c, and 8d provide a rolling surface between cams 9a and 9b and cam ends 21a and 21b with the mount block 6. Distance of center mark for cams 9a and 9b in the unlocked position is defined by cam unlock distance 30. Distance of center mark for cams 9a and 9b in the locked position is defined by cam lock distance 29. Cam unlock distance 30 is greater than cam lock distance 29. Cams 9a and 9b rotate between lock distance 29 and unlock distance 30. Latches 11a and 11b translate with cams 9a and 9b. Pivot lock ends 35a and 35b are secured within latch detents 36a and 36b and force pivot locks 19a and 19b to rotate as latches 11a and 11b translate. Force is applied to saddle rails 28a and 28b between rail grooves 37a and 37b and rail capture surfaces 34a and 34b of pivot locks 19a and 19b. Cams 9a and 9b rotate over center when in the locked position biasing control levers 10a and 10b towards the lever lock stops 27a and 27b.

Removal of cycling saddle 41 from quick-release saddle adapter 38 requires control levers 10a to 10b to be in the unlocked position as shown in FIG. 5B. Release latch detents 36a and 36b from pivot lock ends 35a and 35b by rotating latches 11a and 11h about axis of cams 9a and 9b away from pivot locks 19a and 19b allowing pivot locks 19a and 19b to rotate freely. Appling force to cycling saddle 41 in the vertical direction away from quick-release saddle adapter 38 rotates pivot locks 19a and 19b which releases saddle rails 28a and 28b from rail capture surface 34a and 34b.

Figure 10A:
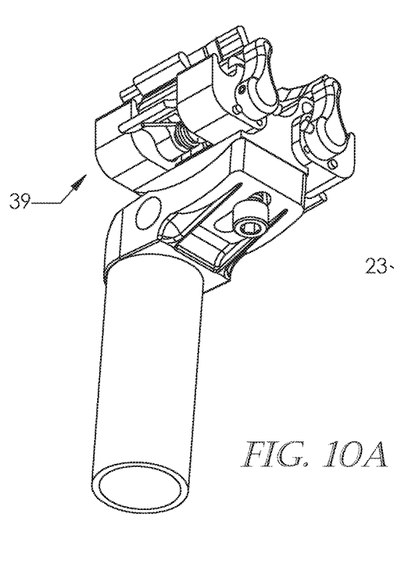
FIG. 10A is a perspective view of the saddle quick-release mechanism that contains a unique interface that allows it to be combined to a custom post.
Figure 10B:
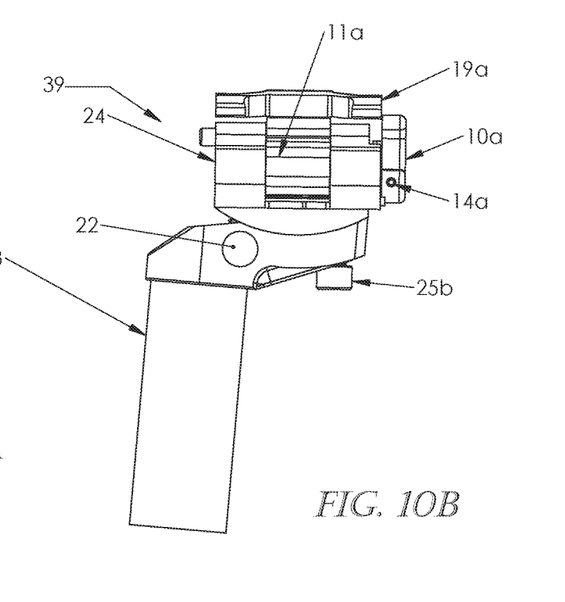
FIG. 10B is a side perspective view of the system shown in FIG. 10A.
Figure 10C:
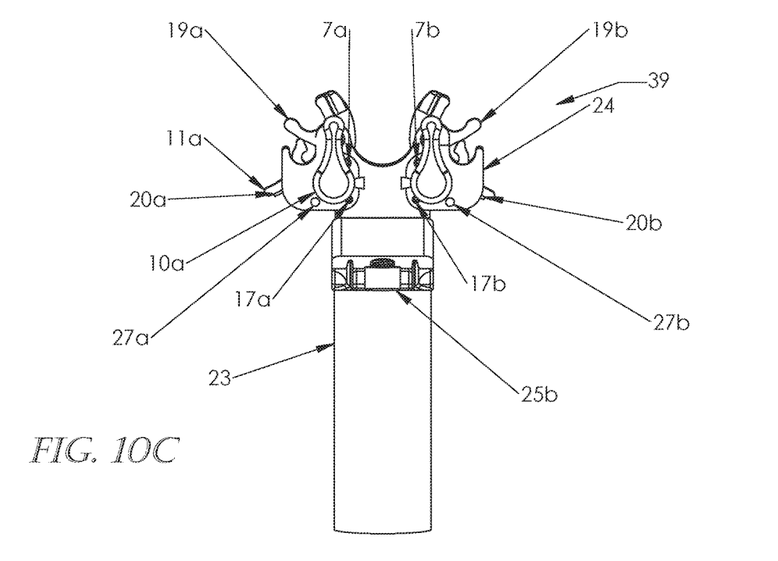
FIG. 10C is the rear perspective view of the system shown in FIG. 10C.
Figure 11:
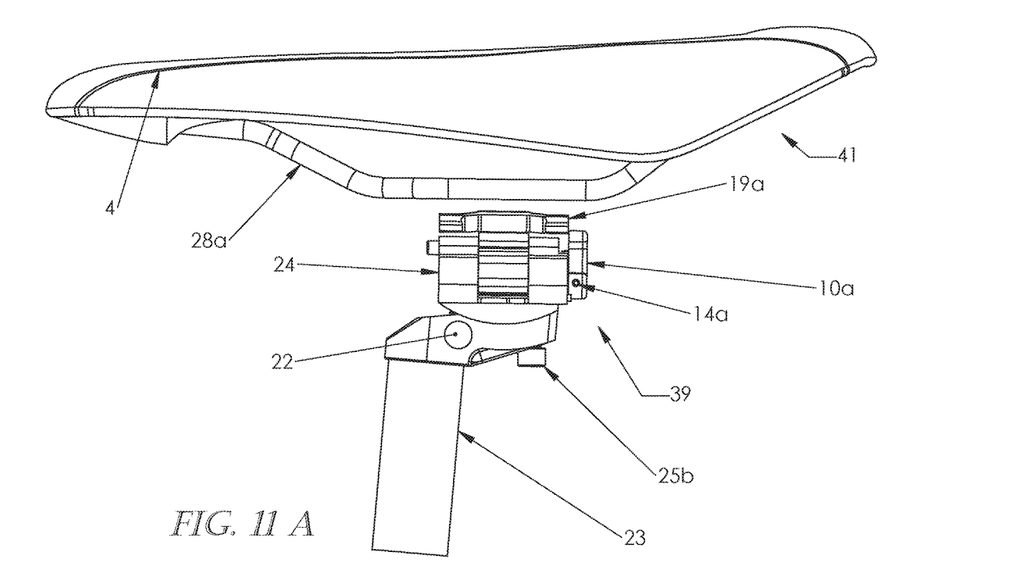
FIG. 11A is a side perspective view of a cycling saddle aligned above the saddle quick-release mechanism coupled to a custom post shown in FIG. 10A.
FIG. 11B is the rear perspective of the system shown in FIG. 11A.
Figure 11B:
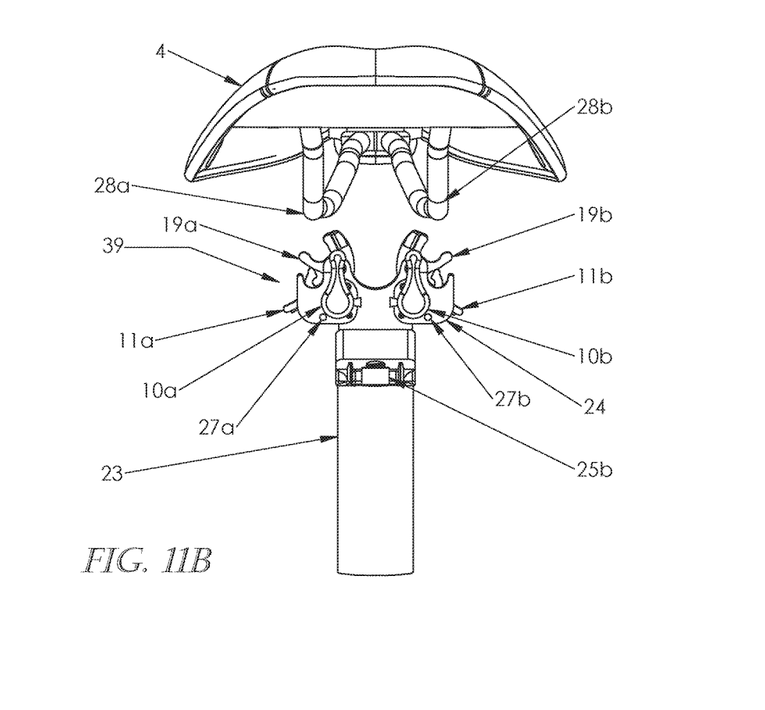
Figure 12A:
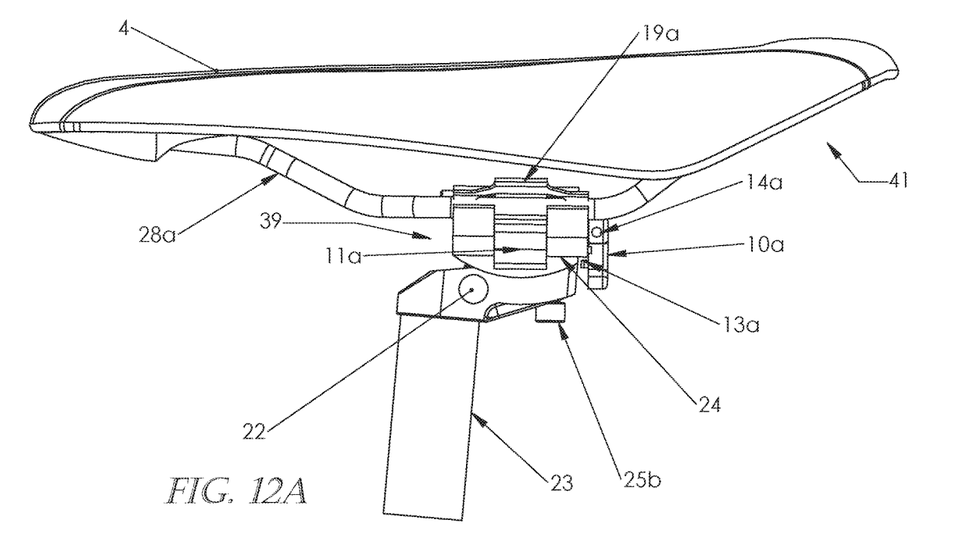
FIG. 12A is a side perspective view of the cycling saddle secured to the saddle quick-release mechanism and custom post.
Figure 12B:
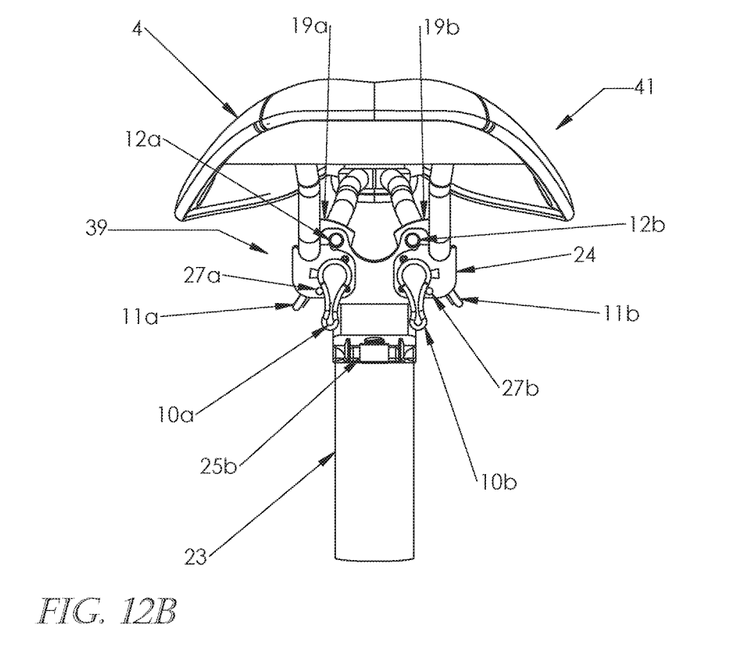
FIG. 12B is the rear perspective of the system shown in FIG. 12A.

An illustrative embodiment of an integrated quick-release saddle adapter 39 includes a custom mount post 23, pivot pin 22, pivot mount block 24, screws 25a and 25b, and the quick-release mechanism described in previous embodiments as shown in FIGS. 10A, 10B, and 10C.

Figure 13:
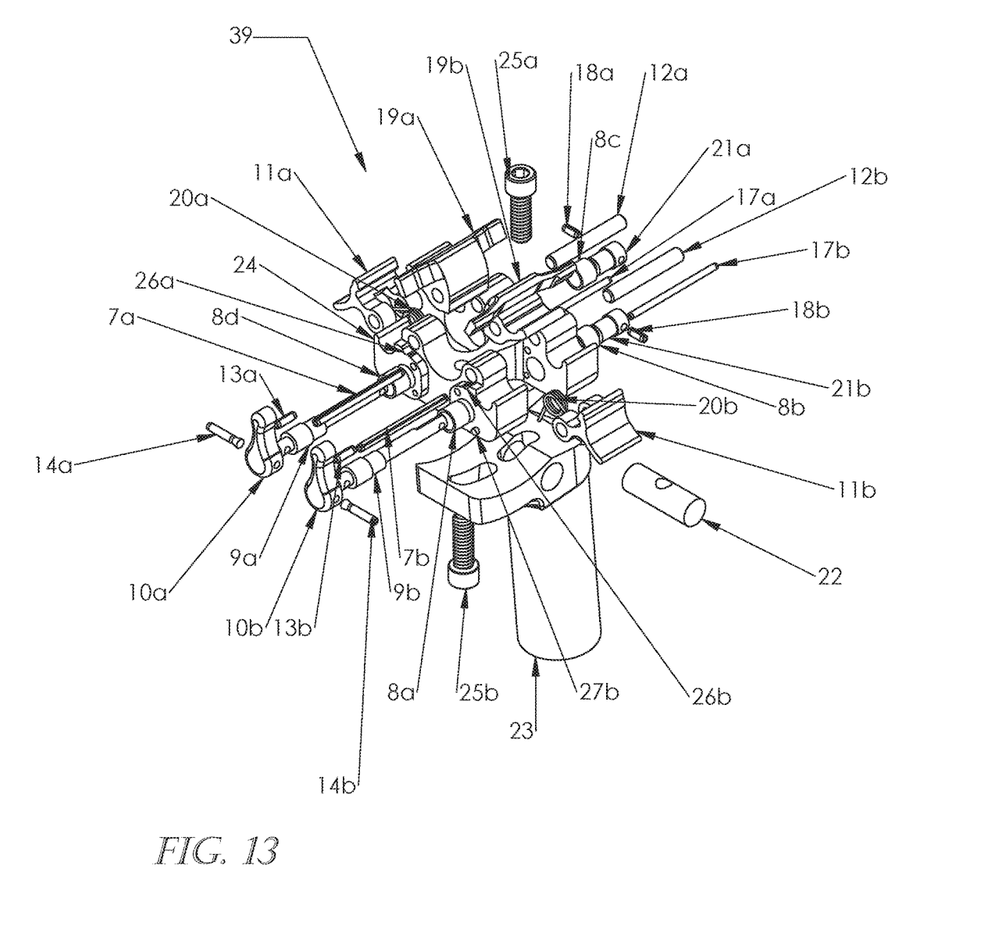
FIG. 13 is an exploded perspective view depicting all of the individual components that make up the saddle quick-release mechanism and the custom post interface.

Pivot mount block 24 mounts to custom mount post 23 by screws 25a and 25b as shown in FIG. 13. Screw 25b threads into the pivot mount block 24 and tightens through a slot against the custom mount post 23. Screw 25a threads into pivot pin 22 and tightens against the pivot mount block 24. Arcuate portion of pivot mount block 24 mates to arcuate portion of custom mount post 23 allowing the user to adjust the angle of the cycling saddle 41 by tightening screws 25a and 25b against each other at different locations. Pivot pin 22 allows for screw 25a to be tightened at multiple angles.

Although certain illustrative embodiments have been described in detail above, variations and modifications exist within the scope and spirit of this disclosure as described and as defined in the following claims.

As utilized herein, the terms "comprises" and "comprising" are intended to be construed as being inclusive, not exclusive. As utilized herein, the terms "exemplary", "example", and "illustrative", are intended to mean "serving as an example, instance, or illustration" and should not be construed as indicating, or not indicating, a preferred or advantageous configuration relative to other configurations. As utilized herein, the terms "about" and "approximately" are intended to cover variations that may existing in the upper and lower limits of the ranges of subjective or objective values, such as variations in properties, parameters, sizes, and dimensions. In one non-limiting example, the terms "about" and "approximately" mean at, or plus 10 percent or less, or minus 10 percent or less. In one non-limiting example, the terms "about" and "approximately" mean sufficiently close to be deemed by one of skill in the art in the relevant field to be included. As utilized herein, the terms "substantially" and "generally" refer to the complete or nearly complete extend or degree of an action, characteristic, property, state, structure, item, or result, as would be appreciated by one of skill in the art. For example, an object that is "substantially" or "generally" circular would mean that the object is either completely a circle to mathematically determinable limits, or nearly a circle as would be recognized or understood by one of skill in the art. The exact allowable degree of deviation from absolute completeness may in some instances depend on the specific context. However, in general, the nearness of completion will be so as to have the same overall result as if absolute and total completion were achieved or obtained. The use of "substantially" or "generally" is equally applicable when utilized in a negative connotation to refer to the complete or near complete lack of an action, characteristic, property, state, structure, item, or result, as would be appreciated by one of skill in the art.

Numerous modifications and alternative embodiments of the present invention will be apparent to those skilled in the art in view of the foregoing description. Accordingly, this description is to be construed as illustrative only and is for the purpose of teaching those skilled in the art the best mode for carrying out the present invention. Details of the structure may vary substantially without departing from the spirit of the present invention, and exclusive use of all modifications that come within the scope of the appended claims is reserved. Within this specification embodiments have been described in a way which enables a clear and concise specification to be written, but it is intended and will be appreciated that embodiments may be variously combined or separated without parting from the invention. It is intended that the present invention be limited only to the extent required by the appended claims and the applicable rules of law.

It is also to be understood that the following claims are to cover all generic and specific features of the invention described herein, and all statements of the scope of the invention which, as a matter of language, might be said to fall therebetween.

What is claimed is:

1. A quick-release saddle adapter apparatus for a cycling apparatus, the quick-release saddle adapter apparatus comprising:
   a pair of adapter rails fixedly attachable to a mount post of the cycling apparatus;
   a mount block fixedly attached to the adapter rails, the adapter rails extending from a lower face of the mount block;
   a pair of rail grooves disposed in an upper face of the mount block and configured to receive saddle rails of a cycling saddle;
   a pair of pivot locks with pins pivotally coupling the pivot locks to the mount block, each pivot lock disposed within one of the rail grooves and a rail capture surface being fixedly attached to each of the pivot locks, the pivot locks being pivotable between a locked position and an unlocked position, wherein the rail capture surfaces are configured to hold the saddle rails of the cycling saddle in place within the rail grooves when in the locked position and release the saddle rails of the cycling saddle when in the unlocked position;
   a pair of latches pivotally coupled to the mount block about a pair of corresponding cams each rotatably coupled within a bushing disposed within the mount block, each latch comprising a latch detent for engaging and retaining a respective one of the pivot locks in the locked position, wherein the latches are spring-biased to retain the pivot locks in the locked position by torsion springs winding around the cams and compressed between a pair of pins in the mount block and a surface of the latches; and a control lever affixed to each cam and rotatably coupled to the mount block with the cam between a locked lever position and an unlocked lever position, wherein in the locked lever position, the control levers and cams are rotated to pivot the latches to a positon for retaining the pivot locks in the locked position, and wherein in the unlocked lever position, the control levers and cams are rotated to pivot the latches to a positon for releasing the pivot locks and allowing the pivot locks to pivoted to the unlocked position.

2. The quick-release saddle adapter of claim 1, wherein:
the adapter rails are located between an upper clamp and a lower clamp, the upper clamp and the lower clamp are configured to fixedly attach the adapter rails to the mount post by tightening a screw; and
the adapter rails are fixedly attached to the mount block by means of pressed-in pins traveling through the adapter rails and the mount block.

3. The quick-release saddle adapter of claim 1, wherein when in the locked position, a spring force from the torsion springs forces the latches against the pivot locks, coupling the saddle rails to the quick-release saddle adapter.

4. The quick-release saddle adapter of claim 3, wherein when pressing the cycling saddle into the quick-release saddle adapter, the saddle rails contact an open face of the pivot locks in the unlocked position and causes the pivot locks to rotate about the pins and the latches to rotate about the cams to compress and increase a force of the torsion springs to the locked position.

5. The quick-release saddle adapter of claim 1, further comprising an opening in the mount block configured to receive a padlock loop, an insertion of the padlock loop in the opening prevents the cycling saddle from being removed from the quick-release saddle adapter.

6. The quick-release saddle adapter of claim 1, wherein the control levers are removably coupled to the mount block.

7. The quick-release saddle adapter of claim 1, wherein:
when the control levers are in the locked lever position, the latch detents hold the pivot locks in the locked lever position; and
when the control levers are in the unlocked lever position, and when the latch detents are rotated away from the pivot locks, the pivot locks are released;
wherein applying a vertical force to the cycling saddle in direction away from the mount post causes the pivot locks to rotate to the unlocked position and the cycling saddle is removed from the quick-release saddle adapter.

* * * * *

UNITED STATES PATENT AND TRADEMARK OFFICE
CERTIFICATE OF CORRECTION

PATENT NO. : 10,717,485 B2  
APPLICATION NO. : 15/385390  
DATED : July 21, 2020  
INVENTOR(S) : Joshua C. Hight Page 1 of 1

It is certified that error appears in the above-identified patent and that said Letters Patent is hereby corrected as shown below:

In the Claims

Claim 1, Column 8, Line 62, delete "surfaces are" and insert --surface is--

Claim 1, Column 9, Line 13, delete "positon" and insert --position--

Claim 1, Column 9, Line 16, delete "positon" and insert --position--

Claim 1, Column 9, Line 17, delete "pivoted" and insert --pivot--

Signed and Sealed this  
Thirtieth Day of March, 2021

Drew Hirshfeld  
*Performing the Functions and Duties of the*  
*Under Secretary of Commerce for Intellectual Property and*  
*Director of the United States Patent and Trademark Office*